(12) United States Patent
Behrendt

(10) Patent No.: US 10,014,757 B2
(45) Date of Patent: Jul. 3, 2018

(54) POLYMER-BASED LAYER STRUCTURE WITH AN OLEOPHOBIC/HYDROPHOBIC SURFACE, AND ELECTRIC MACHINE COMPRISING SUCH A LAYER STRUCTURE

(71) Applicant: Volkswagen Aktiengesellschaft, Wolfsburg (DE)

(72) Inventor: Reiner Nico Behrendt, Wolfsburg (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 651 days.

(21) Appl. No.: 14/440,031

(22) PCT Filed: Oct. 31, 2013

(86) PCT No.: PCT/EP2013/072784
§ 371 (c)(1),
(2) Date: Apr. 30, 2015

(87) PCT Pub. No.: WO2014/068041
PCT Pub. Date: May 8, 2014

(65) Prior Publication Data
US 2015/0318770 A1 Nov. 5, 2015

(30) Foreign Application Priority Data
Nov. 2, 2012 (DE) .................. 10 2012 021 494

(51) Int. Cl.
*H02K 15/12* (2006.01)
*H02K 3/44* (2006.01)
(Continued)

(52) U.S. Cl.
CPC ............. *H02K 15/12* (2013.01); *B05D 5/083* (2013.01); *C08J 7/047* (2013.01); *H02K 1/2786* (2013.01);
(Continued)

(58) Field of Classification Search
CPC .................................. H02K 3/38; H02K 3/44
See application file for complete search history.

(56) References Cited

U.S. PATENT DOCUMENTS

| 5,416,373 A | 5/1995 | Maruyama et al. |
| 6,383,642 B1 | 5/2002 | Le Bellac et al. |
| (Continued) | | |

FOREIGN PATENT DOCUMENTS

| CN | 1501968 A | 6/2004 |
| CN | 101156296 A | 4/2008 |
| (Continued) | | |

OTHER PUBLICATIONS

Web page of tridecafluorooctyl triethoxy siloxane product retrieved from Sigma Aldrich.*
(Continued)

*Primary Examiner* — John K Kim
*Assistant Examiner* — Minki Chang
(74) *Attorney, Agent, or Firm* — Pearl Cohen Zedek Latzer Baratz LLP

(57) ABSTRACT

A polymer-based layer structure with an oleophobic/hydrophobic surface for coating, sealing, and/or connecting technical components or parts of said components, comprising—a first layer which comprises a polymer, —a second layer that adjoins the first layer and comprises a polymer and particles which comprise a fluoropolymer and which are distributed in the silicone, and —an outer layer that adjoins the second layer and comprises a fluorocarbon compound with at least one reactive group and optionally particles which comprise a fluoropolymer and which are distributed in the fluorocarbon compound. The invention also relates to an electric machine which has the layer structure, said layer structure being provided in particular as a potting compound
(Continued)

on a winding and/or on switching rings of the stator and/or as a magnet bonding adhesive of the rotor.

19 Claims, 3 Drawing Sheets

(51) Int. Cl.
| | |
|---|---|
| *H02K 3/32* | (2006.01) |
| *C08J 7/04* | (2006.01) |
| *B05D 5/08* | (2006.01) |
| *H02K 1/27* | (2006.01) |
| *H02K 3/30* | (2006.01) |
| *H02K 3/38* | (2006.01) |
| *H02K 3/52* | (2006.01) |
| *H02K 5/08* | (2006.01) |
| *B05D 7/00* | (2006.01) |

(52) U.S. Cl.
CPC .............. *H02K 3/30* (2013.01); *H02K 3/325* (2013.01); *H02K 3/38* (2013.01); *H02K 3/44* (2013.01); *B05D 7/56* (2013.01); *B05D 2602/00* (2013.01); *H02K 3/522* (2013.01); *H02K 5/08* (2013.01); *H02K 2203/09* (2013.01); *Y10T 428/3154* (2015.04); *Y10T 428/31544* (2015.04)

(56) References Cited

U.S. PATENT DOCUMENTS

| | | | |
|---|---|---|---|
| 2002/0016433 A1 | 2/2002 | Keller et al. | |
| 2002/0192385 A1 | 12/2002 | Jenkner et al. | |
| 2008/0299359 A1* | 12/2008 | Klaussner | H02K 3/38 428/206 |
| 2010/0140527 A1* | 6/2010 | Glime | C09D 4/00 251/359 |
| 2011/0008615 A1* | 1/2011 | Myers | C09D 133/08 428/328 |
| 2011/0045200 A1 | 2/2011 | Hsueh et al. | |
| 2012/0107558 A1* | 5/2012 | Koval | C03C 17/3429 428/142 |
| 2012/0116017 A1* | 5/2012 | Brothers | C08F 14/18 524/805 |
| 2015/0288022 A1* | 10/2015 | Lee | H01M 10/0431 429/94 |

FOREIGN PATENT DOCUMENTS

| | | | | |
|---|---|---|---|---|
| CN | 102325719 A | | 1/2012 | |
| DE | 31 33 734 C2 | | 3/1983 | |
| DE | 100 22 246 A1 | | 11/2001 | |
| DE | 10 2005 017 112 A1 | | 10/2006 | |
| DE | 10 2005 017 113 B4 | | 10/2006 | |
| EP | 0 629 673 A2 | | 12/1994 | |
| EP | 1 221 347 A2 | | 7/2002 | |
| WO | WO 02/055 446 A1 | | 7/2002 | |
| WO | WO 2006/108814 A1 | | 10/2006 | |
| WO | WO 2009086703 A1 * | | 7/2009 | ............... H02K 3/38 |
| WO | WO 2012 061240 A1 | | 5/2012 | |

OTHER PUBLICATIONS

International Search Report for PCT International Application No. PCT/EP2013/072784, dated Feb. 18, 2014.
Search Report for German Patent Application No. 10 2012 021 494.4, dated Sep. 27, 2013.
Jiang, Lei et al. "Bionic Intelligent Nano-Interfacial Materials", 1st edition May 2007, pp. 38-41, Chemical Industry Press, publication date: May 31, 2007.
Office Action for Chinese Patent Application No. 201380057317.2, dated Feb. 28, 2017.
"Surfactant Chemistry", Wang Shirong et al., the 1st edition, p. 179-183, Chemical Industry Press.
Office Action of Chinese Patent Application No. 201380057317.2, dated Oct. 8, 2016.

* cited by examiner

POLYMER-BASED LAYER STRUCTURE WITH AN OLEOPHOBIC/HYDROPHOBIC SURFACE, AND ELECTRIC MACHINE COMPRISING SUCH A LAYER STRUCTURE

CROSS-REFERENCE TO RELATED APPLICATIONS

This application is a National Phase Application of PCT International Application No. PCT/EP2013/072784, International Filing Date Oct. 31, 2013, claiming priority of German Patent Application No. 10 2012 021 494.4, filed Nov. 2, 2012, which is hereby incorporated by reference in its entirety.

FIELD OF THE INVENTION

The invention relates to a polymer-based layer structure with an oleophobic-hydrophobic surface for purposes of coating, sealing and/or joining technical components or parts thereof, especially as a potting compound for windings and/or connector rings for such windings, or else as an adhesive structure for magnets. The invention also relates to an electric machine having such a layer structure, especially as a potting compound for windings and/or connector rings for such windings, or else as an adhesive structure for magnets.

BACKGROUND OF THE INVENTION

Polymers are employed in the technical realm especially as potting compounds for electric machines, printed circuit boards or electric modules, but also as an adhesive structure and as a coating, for example, in the form of protective lacquers. Many material groups of the components involved often show signs of corrosion or swelling when they come into contact with oily and/or aqueous solutions. One example of this is so-called copper corrosion, which frequently occurs when electric and/or electronic components come into contact with the media needed for the proper functioning. In the area of the adhesive structure, in contrast, problems occur especially when moisture penetrates between the contact areas of the polymer and the component, where it causes corrosion, decomposition and swelling which, in turn, can cause the destruction of the adhesive bond and of the component. Such problems are particularly relevant in the realm of electric machines.

Electric machines (electromechanical converters) such as, for instance, electric drive motors for motor vehicles, starters, generators or starter-generators, convert electric energy into mechanical energy (motors) or mechanical energy into electric energy (generators). This electromechanical conversion is based on electromagnetic induction. Such electric machines comprise a stationary stator (stand) which, in a familiar design, encompasses a stator core (core stack) with corresponding wire windings and one or more connector rings arranged thereupon as well as a movable component which, in the most common design, is configured as a rotor (armature) which is rotatably mounted in or around the ring-shaped stator and which has a plurality of permanent magnets. In this context, the moving magnetic field of the rotor generates a current flow in the stator winding (generator) or else the magnetic field generated by the stator brings about the mechanical movement or rotation of the rotor (motor). Opposite designs are likewise known, in which the rotor comprises a winding while the stator comprises magnets.

Parts of the stator and/or rotor containing the winding and the connector ring are embedded in a potting compound in order to provide them with electric insulation and mechanical protection as well as protection against chemical effects. The potting compound is especially used to embed the connector ring (also referred to as an interconnecting ring or contact bridge) which electrically connects the individual windings to each other. Typically, potting compounds are based on silicone rubber. In order to increase their thermal conductivity, these silicone elastomers often contain an additive with large fractions of fillers, for example, in the form of quartz particles. Such materials meet most of the technical requirements made of potting compounds; in particular, they exhibit very low electric conductivity, high thermostability and resistance to cyclic temperature stress, high thermal conductivity, high oxidation stability, good substrate adhesion as well as a simple curing and a high level of processing tolerance. A problem, however, is the high affinity of silicones to hydrocarbons. They display the tendency to pick up motor oil and transmission oil, swelling up in the process. The swelling, however, detrimentally affects the mechanical properties. For instance, the strength and material hardness diminish, which can cause a drop in the thermostability as well as detachment and conceivably brittleness of the potting compound. Especially when it comes to oil-cooled electric motors, whose design means that they come into contact with transmission oils, it would therefore be desirable to reduce or prevent oil absorption and oil swelling by the silicone material.

Problems can also be caused by media penetrating into the area of the adhesive structure for the magnet on the rotor or stator. The adhesives used for the magnets especially include silicone resin systems which are partially filled with glass beads that act as spacers so as to ultimately allow the thickness of the adhesive film to be established. As a matter of principle, the adhesive structure for the magnet has to meet the same technical requirements as the potting compound does (see above) and it additionally has to display a good adhesive effect. In particular, here too, the silicone resin system employed should not be affected by the penetration of moisture or oil, which would diminish the adhesive strength.

German patent specification DE 31 33 734 C2 describes an electric insulation for the winding overhang of a stator or rotor of an electric machine which, at the same time, provides protection against moisture. The coating contains a silicone rubber as the basic material containing rod-shaped copolymers on the basis of styrene-butyl acrylate instead of a mineral filling material.

German patent application DE 10 2005 017 113 A1 discloses a two-layer protective layer arrangement for the winding overhang of an electric machine whose first layer has a gel-like configuration and consists primarily of silicone gel, and whose second layer is harder than the first one. Both layers can consist of silicone rubber although, as an alternative, the second layer can consist of cast resin.

Moreover, the hydrophobic effect of compounds containing fluorine is known from many technical sectors. For example, textiles coated with PFTE or else fluorocarbon chains are covalently bonded to the fibers in order to produce both hydrophobic and, at the same time, oleophobic surfaces. A process likewise known from the textile industry is the application of silicone-based and fluorocarbon-based hydrophobic coatings onto textiles. In the case of synthetic fibers made of polyolefins or polyesters, gas-phase fluorination is additionally employed, involving a complex combination of plasma treatment, air supply, grafting of fluorocarbon monomers and subsequently another plasma treatment in a $CF_4$-atmosphere (U.S. Pat. Appln. Pub. No. 2011/045200 A1).

U.S. Pat. No. 5,416,373 describes a winding for a stator or rotor of an electric machine in which the winding is coated with an electrically insulating film or with a mica tape. An additional coating containing fluorine is applied in the exposed area of the winding overhang in order to protect the winding against moisture.

German patent application DE 10 2005 017 112 A1 likewise describes a protective two-layer arrangement for the winding overhang of an electric machine. The protective layer arrangement comprises a first layer of highly elastic silicone gel adjoining the conductor arrangement of the winding overhang as well as an outer layer containing silicone rubber as the basic material, to which the fine-grained, surface-modified perfluorinated compounds having a particle diameter of about 10 nm have been added. The coating has a nanostructured surface superimposed with a microstructure, and it is characterized by a high degree of hydrophobicity, with water-contact angles of at least 120°.

SUMMARY OF THE INVENTION

The invention is based on the objective of putting forward a polymer-based layer structure whose surface repels moisture as well as oily substances, that is to say, that is both hydrophobic and oleophobic, thereby preventing a deterioration of its properties caused by the penetration of moisture and/or oils. The material should be suitable especially for electric machines, printed circuit boards and electronic components, for instance, as a potting compound for windings and/or their interconnections and/or as an adhesive structure or protective coating.

This objective is achieved by means of a polymer-based layer structure with an oleophobic-hydrophobic surface as well as by an electric machine having such a layer structure and having the features of the independent claims.

Therefore, a first aspect of the invention relates to a polymer-based layer structure with an oleophobic-hydrophobic surface for coating, sealing and/or joining technical modules or parts thereof, comprising:
a first layer containing a polymer,
a second layer adjoining the first layer and comprising a polymer as well as particles containing a fluoropolymer that is distributed in the polymer as well as
an outer layer adjoining the second layer and comprising a fluorocarbon compound having at least one functional group, and optionally, particles comprising a fluoropolymer that is distributed in the fluorocarbon compound.

Due to the reactive groups of the fluorocarbon compound of the outer layer, on the one hand, an oleophobic (oil-repellent) surface is created. On the other hand, at the same time, the fluorocarbon sections of this compound, together with the polymer basic material of the lower layers, concurrently give rise to a strong hydrophobicity (water-repellent effect). The fluoropolymer particles of the second layer and, if applicable, of the outer layer, have two different functions. First of all, they serve as coupling agents between the first polymer layer and the outer layer. Secondly, the particles give rise to a certain structuring of the surface, especially a nanostructure, which increases the oleophobicity as well as the hydrophobicity.

Preferably, the polymer of the first and/or second layer is a polymer from among the group of thermoplastics, elastomers, thermoplastic elastomers and thermosetting plastics. In the group of thermosetting plastics, particular preference is given to epoxy resins but also to unsaturated polyesters, melamine resins, phenol-formaldehyde resins, urea-formaldehyde resins, polyurethanes and polyisocyanurates, since these substances are especially used in those realms where technical components have to be adhesively joined. Silicones are especially preferred among the elastomers. They are of relevance in the sector of potting compounds. Moreover, however, fluorosilicones, polyurethanes, styrene-butadiene rubbers, polyvinyl butyrate, polyisobutylene, natural rubber, polyisoprene, methacrylate-butadiene-styrene copolymers, fluororubbers, ethylene vinyl acetate, ethylene-propylene copolymers, ethylene-propylene-diene copolymers, ethylene-ethyl-acrylate copolymers, butyl rubbers, butadiene rubber, acrylonitrile-butadiene-acrylate copolymers and acrylonitrile-methyl-methacrylate copolymers are also used as elastomers, as a result of which they are preferably employed in the layer structure according to the invention. Furthermore, owing to their relevance in the technical realm, especially in automotive technology, thermoplastic elastomers (TPE) such as thermoplastic polyurethane, styrene-butadiene-styrene copolymers, polyether-block-amides can be advantageously employed within the scope of the invention. Suitable thermoplastic materials comprise polyphenylene sulfide, polyphenylene sulfone, polyether sulfone, polysulfone, styrene-acrylonitrile copolymers, thermoplastic starch, polyvinyl pyrrolidone, polyvinyl chloride, polyvinyl acetate, polytrimethylene terephthalate, polystyrenes, high-impact polystyrenes, polyolefins such as polymethyl pentene, polypropylenes and polyethylenes, polypyrroles, polyamides, polyphthalamides, polyphenylene ether, polyoxymethylene, polyacrylates, polyacrylnitrile, polyimides, polyamidimides, polyester imides, polyester amides, polybenzimidazoles, polymethacryl imides, polymethacryl methyl imide, polylactide, polyhydroxybutyrate, polyesters such as polyethylene therephthalate and polybutylene therephthalate, polyether ketone, polyetherether ketones, polyether imide, polycarbonates, polycaprolactone, polybutylene succinate, perfluoralkoxyalkanes as well as their copolymers, cycloolefin copolymers, acrylonitrile-butadiene-styrene copolymers and acrylate-styrene-acrylonitrile copolymers.

According to a preferred embodiment, the fluorocarbon compound of the outer layer is a fluoroalkyl siloxane. This is a trifunctional organic compound, more precisely, oligosiloxane functionalized by fluoroalkyl groups and optionally by aminoalkyl groups. Its special advantage in comparison to other fluorocarbon compounds is that, in addition to the oleophobic properties of the compound, chemical reactions take place with the surface of the second layer, along with the formation of Si—O bonds and subsequent cross-linking, as a result of which an excellent bond is created between the polymer and the oleophobizing agent.

In a particularly advantageous embodiment of the invention, it proved to be particularly advantageous to use tridecafluorooctyl triethoxy siloxane as the fluoroalkyl siloxane in the outer layer. This compound lends itself very well for production purposes since, on the one hand, it exhibits excellent adhesion and oleophobization properties and, on the other hand, it is non-toxic and thus can be prepared with little effort.

In an alternative embodiment, the functional groups are polar and/or ionic groups. These especially intensify the oleophobic characteristics of the fluorocarbon compound.

Preferably, the fluorocarbon compound of the outer layer is a fluorotenside, especially an ionic fluorotenside. Fluorotensides comprise, on the one hand, short to medium-length, partially fluorinated or perfluorinated carbon chains exhibiting hydrophobic characteristics. On the other hand, fluorotensides have a polar, especially ionic group, preferably in a terminal position, which imparts the compound with the desired oleophobic character. Preferred chain lengths of the hydrophobic partially fluorinated or perfluorinated carbon chains lie in the range from 2 to 40 carbon atoms, especially 4 to 30 carbon atoms, preferably 5 to 15 carbon atoms.

In a preferred embodiment of the invention, the fluorotenside is selected from the group comprising partially fluorinated or perfluorinated phosphoric acid esters, comprising monoesters, diesters and triesters of phosphoric acid as well as diphosphoric acid ester and triphosphoric acid ester; partially fluorinated or perfluorinated phosphonic acid esters, comprising monoesters and diesters of phosphonic acid, as well as diphosphoric acid ester and triphosphoric acid ester; partially fluorinated or perfluorinated sulfonic acids; partially fluorinated or perfluorinated sulfuric acid esters; partially fluorinated or perfluorinated carboxylic acids as well as oligomers or telomers, salts and mixtures of the above-mentioned compounds.

In an especially advantageous embodiment of the invention, it has proven to be particularly advantageous to use a partially fluorinated, preferably unbranched $C_2$-$C_{40}$ phosphoric acid alkyl ester as the fluorotenside. Particularly good results are achieved with such a compound obtained from the chemical reaction of 1H,1H,2H,2H-perfluoro-1-octanol and phosphorus pentoxide, or a salt of this product. The reaction product is probably a mixture of the corresponding monooctyl esters and dioctylesters of phosphoric acid as well as diphosphoric acid octylester. Preferably, an ammonium salt of this reaction product is used.

Preferred weights per unit area of the fluorocarbon compound lie within the range from 0.01 $g/cm^2$ to 1.0 $g/cm^2$, especially from 0.1 $g/cm^2$ to 0.5 $g/cm^2$. Below these limits, the oleophobic effect of the compound is too weak. Weights per unit area above these limits, in contrast, do not yield any perceptible increase in the oleophobicity. Moreover, at greater weights per unit area, the surface structure created by the particles of the second layer is increasingly smoothed.

In an advantageous manner, the outer layer can contain a binder or wetting agent, as a result of which, on the one hand, the stability of the outer layer is increased and, on the other hand, its wetting on the second layer containing polymers is improved. In a preferred embodiment, a binder or wetting agent on the basis of acrylate can be employed.

Preferably, the outer layer, like the second layer, contains particles of a fluoropolymer. Preferably, the fluoropolymer of the particles of the second layer and/or of the outer layer, independently of each other, is a partially fluorinated or perfluorinated hydrocarbon polymer, whereby perfluorinated compounds are preferred. In particular, the fluoropolymer is selected from among polytetrafluoroethylene (PTFE), polyvinylidene fluoride (PVDF) or mixtures thereof. These materials are known to be characterized by very high mechanical and chemical stability and moreover, they have hydrophobic properties, as a result of which the water absorption of the coating is reduced.

Particles having mean diameters of 50 nm to 10,000 nm (0.05 µm to 10 µm), especially from 100 nm to 7,500 nm (0.1 µm to 7.5 µm) are well-suited to generate a commensurately advantageous nanostructured and microstructured surface. In a particularly advantageous manner, mixtures having different particle diameters can also be used in order to create a microstructured surface onto which a nanostructuring is superimposed.

The mass fraction of fluoropolymer particles in the second layer and/or in the outer layer lies especially within the range from 1% to 40% by weight, preferably 5% to 30% by weight, in each case relative to the total weight of the layer in question. For example, the mass fraction of fluoropolymer particles in the second layer and/or in the outer layer amounts to 10% to 20% by weight.

It has been surprisingly found that a preparation of such fluoropolymer particles in a solution of the especially polar and/or ionic fluorocarbon compound of the outer layer yields a transparent solution. This indicates that the fluoropolymer, for instance, PTFE, dissolves or at least is dispersed very thoroughly. As the outer film dries, the solvent or wetting agent de-polymerizes or evaporates so that the fluoropolymer precipitates again and particles form once again. As a result, a sort of lotus effect takes place. The partial dissolution of the particles through the outer layer also applies to the fluoropolymer particles of the second layer located on the outer boundary layer to the outer layer. In this manner, the adhesion between the second layer and the outer layer is improved even further.

According to a preferred embodiment of the invention, the polymer of the first layer and/or of the second layer comprises a silicone, especially a silicone rubber, whereby it is preferably from the group of the methyl polysiloxane rubbers (MQ). Such silicone rubbers are already in widespread use nowadays in potting compounds of electric machines, for instance, for their winding overhangs and/or connector rings. Particularly vinyl-methyl polysiloxane rubbers (VMQ), phenyl-vinyl-methyl polysiloxane rubbers (PVMQ) or their mixtures are characterized by their very advantageous thermal and electric properties in this sector.

If the layer structure is meant to glue components, for instance, to glue the magnets of electric machines, the polymer used for the first layer and/or for the second layer is preferably a silicone adhesive, especially an addition cross-linked silicone resin. Such silicone resins are already employed nowadays for gluing magnets in electric machines.

Particularly good adhesion between the first layer and the second layer is obtained when both layers contain chemically similar or identical polymers, especially silicones. This not only ensures chemical compatibility but also a similar or identical thermal expansion of both polymer layers.

Depending on the specific requirements, the first layer can comprise a filler. Examples of this are especially particles, beads or hollow beads. They are preferably made of quartz, glass, aluminum oxide, boron nitride, graphite or metal. For example, in potting compounds based on silicone rubber, the thermal conductivity can be enhanced through the addition of quartz particles. Glass or quartz beads or hollow beads can also act as spacers in order to attain the desired thickness of the adhesive layer.

In a preferred embodiment of the invention, the layer structure is configured on the basis of silicone and it comprises:
  a first layer containing a silicone,
  a second layer adjoining the first layer and comprising a silicone as well as particles comprising a fluoropolymer that is distributed in the silicone as well as
  an outer layer adjoining the second layer and comprising a fluorocarbon compound having at least one polar and/or ionic group, and particles comprising a fluoropolymer that is optionally distributed in the fluorocarbon compound.

Another aspect of the present invention relates to an electric machine comprising a stator and a rotor, whereby the stator and/or the rotor has windings and/or permanent magnets. In this context, in order to electrically connect the windings and/or as an adhesive structure for the magnets, the electric machine according to the invention has an oleophobic-hydrophobic layer structure according to the present invention in the area of the windings and/or in the area of the connector rings. Particularly in the case of oil-cooled electric motors, whose design means that they come into contact with oil, the long-term stability of the appertaining polymer structure is prolonged by the oleophobic-hydrophobic finish according to the invention.

BRIEF DESCRIPTION OF THE DRAWINGS

The invention will be explained below in embodiments on the basis of the accompanying drawings. The following is shown.

DETAILED DESCRIPTION OF THE INVENTION

The present invention will be explained in greater detail below on the basis of the example of a potting compound for a stator as well as for an adhesive structure for a magnet for the rotor of an electric motor.

However, it goes without saying that the inventive polymer-based layered arrangement with an oleophobic-hydrophobic surface can also be used in conjunction with other machines or components.

Figure 1A:
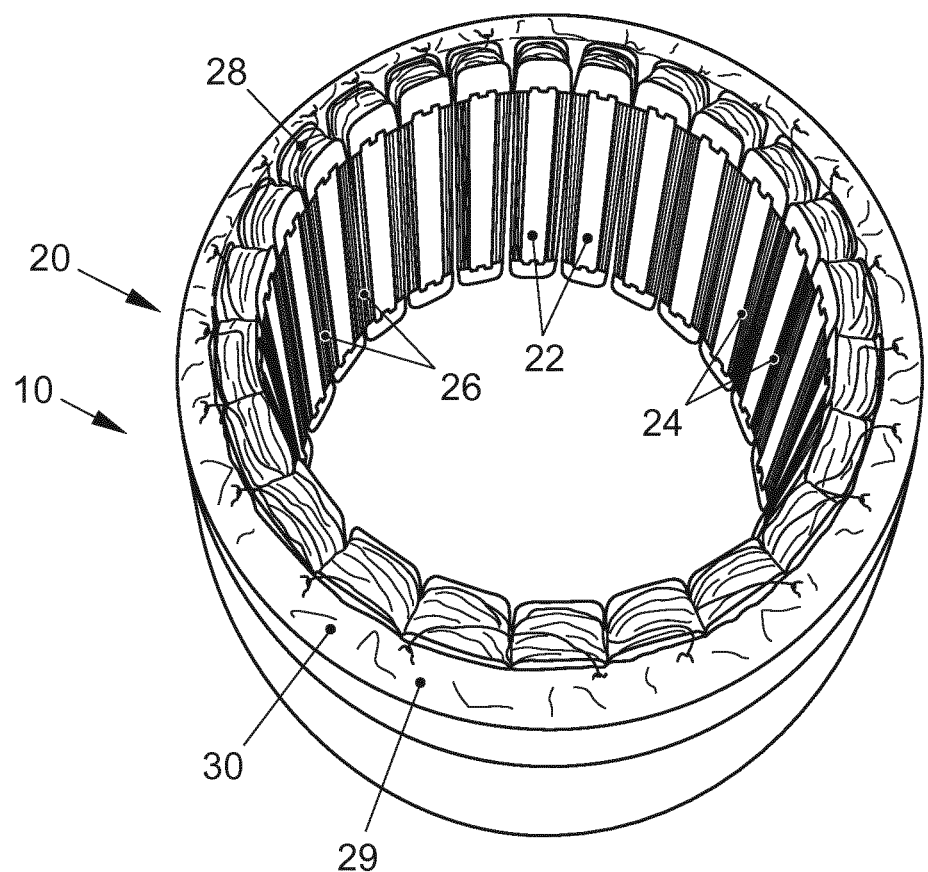
FIG. 1A-B: a stator (A) and a rotor (B) of an electric motor, in a perspective view.
Figure 1B:
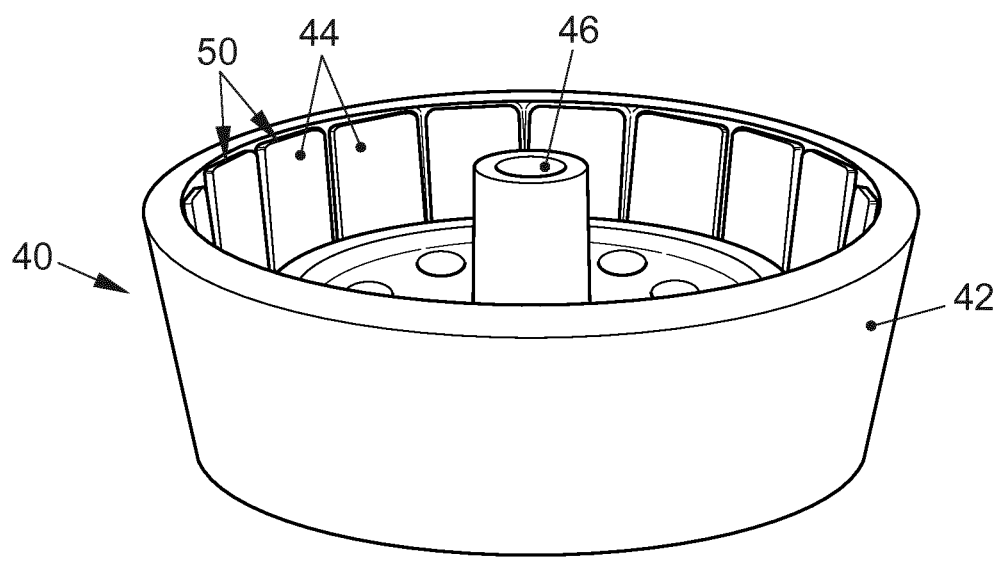

The main components of an electric motor designated in its entirety by the reference numeral 10 will be explained on the basis of FIGS. 1A and 1B, whereby FIG. 1A shows a stator 20 while FIG. 1B shows a rotor 40.

The stator 20 shown in FIG. 1A has a stator core 22 which usually consists of a core stack with a plurality of vertically stacked individual plates made, for instance, of steel. The inner circumference of the stator core (core stack) 22 has vertical grooves 24 positioned at regular intervals. In and around the grooves 24, there are windings 26 which typically consist of continuous insulation-coated copper wire. The part of the windings 26 that extends beyond the stator core 22 is referred to as the winding overhang 28.

The partial windings 26 are electrically connected to each other by means of a connector ring 29 (not visible in FIG. 1A). For example, in the case of a three-phase electric motor, every third partial winding of the total of 24 partial windings here is connected to each other via a shared connector ring segment, so that, in this example, a connector ring 29 has three segments that each electrically connect eight partial windings to each other. For purposes of electric insulation of the connector ring 29 (not visible here), the top outer section of the winding overhang 28 as well as of the connector ring is embedded in a polymer-based potting compound 30 which is configured in the form of the inventive layer structure with an oleophobic-hydrophobic surface finish. This will be elaborated upon below with reference to FIGS. 2 and 3.

The rotor 40 shown in FIG. 1B has a rotor core (core stack) 42 as well as a plurality of permanent magnets 44 that are glued to the rotor core 42. In the embodiment shown by way of an example, the rotor 40 is configured as an external armature, so that the magnets 44 are arranged on its inner circumferential surface. In this case, in the mounted state, the stator 20 is located inside the rotor 40, so that there is an air gap between the winding 26 of the stator 20 and the magnets 44 of the rotor 40. In an alternative embodiment, the rotor 40 can also be configured as an internal armature, whereby the magnets are arranged on the outer circumference of the rotor core 42. The rotor 40 also has a central hub 46 that is non-rotatably joined to a drive shaft (not shown here). The magnets 44 are joined to the rotor core 42 by means of adhesive structures 50 which are configured in the form of an inventive layer structure with an oleophobic-hydrophobic surface finish, which will be explained below on the basis of FIG. 4.

Figure 2:
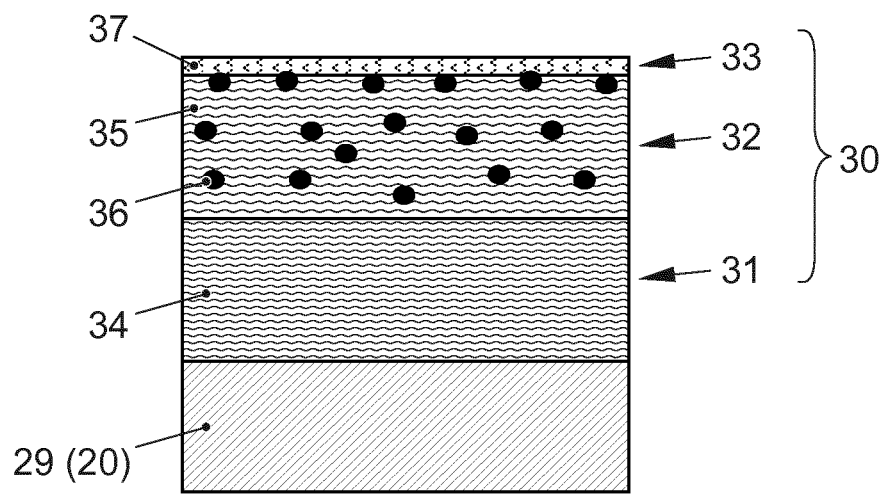
FIG. 2: a schematic sectional view of a polymer-based layer structure with an oleophobic-hydrophobic surface as the potting compound, for a connector ring of a stator according to a first embodiment of the invention.

FIG. 2 shows a schematic sectional view of the connector ring 29 of a stator 20, and a potting compound 30 applied onto it in the form of a layer structure according to the invention. The layer structure 30 according to the invention has three layers 31, 32, 33.

The first layer 31 adjoins the surface of the connector ring 29. The first layer 31 comprises a polymer 34 or is made of such a polymer. The polymer 34 is especially a silicone, preferably a methyl polysiloxane rubber, for instance, a vinyl methyl polysiloxane rubber (VMQ) or else a phenyl-vinyl-methyl polysiloxane rubber (PVMQ). For example, the silicone elastomer sold under the brand name RAKU-SIL® 10-S 13/9 (manufactured by Rampf Giessharze GmbH & Co. KG) can be employed. Preferably, addition cross-linking silicone rubbers are used since, with condensation cross-linking rubbers, the product water that splits off during production cannot escape via the layer above it. Otherwise, in the case of condensation cross-linking rubbers, it would be necessary to first completely cure the layer 31 before the next layer is applied. The thickness of the first layer 31 depends on the component that has to be completely embedded, and especially on the height of the connector ring 29. The thickness typically amounts to several millimeters, for instance, 5 mm.

The second layer 32, which is arranged on the surface of the first layer 31, likewise comprises a polymer 35 as well as particles 36 of a fluoropolymer. The polymer 35 of the second layer 32 is preferably the same material as the polymer 34 of the first layer 31, in other words, for example, a silicone. As an alternative, the second layer 32 can comprise a coupling agent or an organic binder. Preferred materials are, for instance, from the Klübertop® product line (Klübertop® TP 16-812, Klübertop® TP 22, Klübertop® TP 27, Klübertop® TP 27-1310, Klübertop® TP 28-1311 and Klübertop® TP 31, 1310) made by the Klüber company. PTFE particles or PVDF particles are employed as the particles 36 (e.g. PTFE particles: Pro 47 PP, particle size of 0.2 µm to 6 µm, made by SAB Berschneider; WINIX® 6700, particle size of 0.12 µm to 4 µm, made by WINIX GmbH; PVDF particles: Hylar® 301 F, made by Solvay Plastics; MCT LS877 PTFE antifriction coating made by the Microgleit company). The fraction of particles 36 falls within the range, for instance, from 1% to 40%, especially from 5% to 30% by weight, especially about 10% to 20% by weight, relative to the weight of the layer 32. The thickness of the second layer 32 is, for example, 0.05 mm to 5 mm, particularly 0.1 mm to 2 mm, preferably 0.1 mm to 1 mm.

The layer structure 30 also has an outer layer 33 adjoining the second layer 32. The outer layer 33 comprises a fluorocarbon compound 37 which, in the present example, has polar and/or ionic groups. Preferably, the fluorocarbon compound 37 of the third layer 33 is a fluoroalkyl siloxane of the type sold, for example, by the Evonik company, namely, Dynasylan® F8261, Dynasylan® F8263, Dynasylan® F8815, Dynasylan® Sivo and Dynasylan® Sivo Clear as well as Dynasylan® Sivo Clear EC. As an alternative, preference is also given to the use of an ionic fluorotenside as the fluorocarbon compound 37, especially a partially fluorinated $C_2$ to $C_{40}$ phosphoric acid alkyl ester. Preferably, this is a product obtained from the reaction of 1H,1H,2H, 2H-perfluoro-1-octanol and phosphorus pentoxide, or a salt of this product, especially an ammonium salt. This salt preferably contains an acrylate-based binder and/or wetting agent. Such a product is available under the brand name Capstone® FS-63 (made by the DuPont company). Alternatively, the products Capstone® FS-81, Dusgon® 6005 or Zonyl® FSP (all made by DuPont); Dyneon® TF 5032, Dyneon® TF 5041 Z, Dyneon® TF 5050 Z, Dyneon® TF 5060 GZ, Dyneon® TF 5070 GZ (all made by the 3M company) as well as the products Hyflon® D5220X and Hyflon® XPH 5510 made by the Solvay company can be used. In this embodiment, the thickness of the third layer 33 is, for instance, 0.01 mm to 1 mm, especially 0.05 mm to 0.5 mm.

Figure 3:
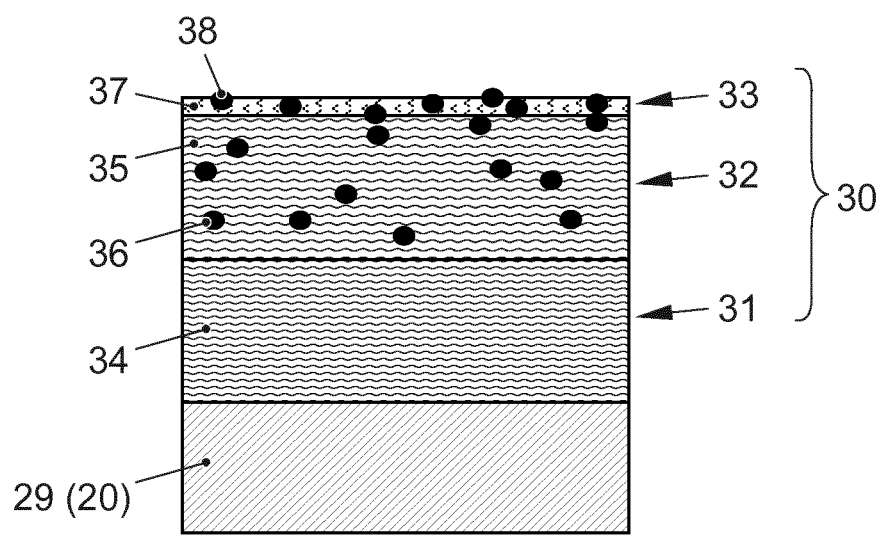
FIG. 3: a schematic sectional view of a polymer-based layer structure with an oleophobic-hydrophobic surface as the potting compound, for the connector ring of a stator according to a second embodiment of the invention.

A potting compound 30 according to a second advantageous embodiment of the invention is shown in FIG. 3. Here, corresponding elements to those in FIG. 2 are provided with the same reference numerals. The potting compound 30 according to FIG. 3 differs from that shown in FIG. 2 in that, in the outer layer 33 (like in the second layer 32), particles 38 of fluoropolymer are distributed there. In this context, the fluoropolymer of the particles 38 of the outer layer 33 can be the same material as that of the particles 36 of the second layer 32, especially PTFE or PVDF. The fraction of particles 36 of the layer 33 falls within the range from, for example, 1% to 40% by weight, 5% to 30% by weight, especially about 10% to 20% by weight, relative to the total weight of the layer 33. The third layer 33 tends to be somewhat thicker than the particle-free layer 33 from FIG. 2. In this embodiment, the thickness of the layer 33 is 0.01 mm to 3 mm, particularly 0.05 mm to 2 mm, especially 0.1 mm to 1 mm.

The layer structure 30 according to the invention shown in FIG. 3 can be produced in that, first of all, the polymer reaction mixture for the layers 31 and 32 is prepared in accordance with the manufacturer's instructions. For instance, in the product RAKU-SIL® 10-S 13/9, the two reaction components are mixed at a ratio of 1:1. For the second layer 32, the fluoropolymer particles (e.g. 10% by weight of PTFE powder) are added to this mixture. In order to produce the first layer 31, the corresponding PTFE-free mixture is applied onto the surface of the stator 20 that is to be coated. Subsequently, the mixture of silicone rubber 35 and PTFE particles 36 is applied onto the first layer 31 in order to create the second layer 32. The two compounds can be applied, for instance, by being brushed on. In this context, the second layer 32 can be applied before the first layer 31 has cured. The layers 31 and 32 are cured in accordance with the manufacturer's instructions and, depending on the component in question, this is carried out while heat is supplied at a temperature of at least 150° C. [302° F.] for at least 10 minutes, especially for about 30 minutes.

Subsequently, a coating agent is prepared for the outer layer 33 in that the fluorocarbon compound 37 is dissolved or suspended in a solvent or carrier medium, for example, water, ethanol and/or isopropanol. Preferably, an acrylate-based binder is also admixed. As an alternative, a product can be used in which the fluorocarbon compound 37 is already present in a solvent or binder (e.g. Capstone® FS-63 made by the DuPont company). The fluoropolymer particles 38 are stirred into this mixture, whereby this surprisingly yields a clear solution, which is an indication that the particles 38 have dissolved or have at least been dispersed very thoroughly. This mixture can be applied, for instance, as an aerosol, onto the second layer 32. Alternatively, the mixture can also be brushed on or dip-coated onto the layer. Subsequently, the layer 33 is dried, which can optionally be done by supplying heat. In this process, the solvent or wetting agent evaporates or de-polymerizes whereby, in turn, the fluoropolymer (PTFE or PVDF) precipitates, thus giving rise to particle formation once again. As a result, the particles 38 are coated by a film of the polar and/or ionic fluorocarbon compound 37.

Figure 4A:
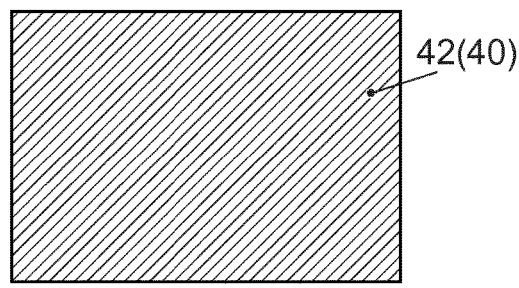
FIG. 4A-E: process steps for the creation of an adhesive structure according to the invention for a magnet for a rotor, whereby
Figure 4B:
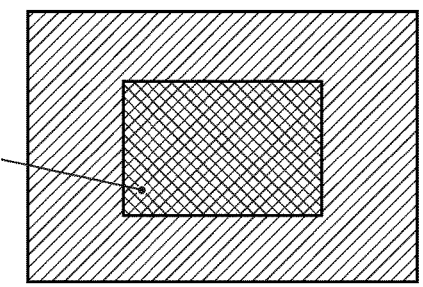

The production as well as the configuration of an adhesive structure 50 for the magnet in the form of the layer structure according to the invention are shown on the basis of FIGS. 4A to 4F. FIG. 4A shows the surface of a rotor 40 or of its rotor core (core stack) 42 onto which a magnet 44 is going to be glued. A first layer 51 of a polymer is applied (FIG. 4B) onto this surface, whereby here, this is a silicone adhesive, particularly an addition cross-linked silicone resin. Here, for instance, the thermally curing product available under the brand name Semicosil® 988/1 K (made by Wacker Chemie AG) can be used.

Figure 4C:
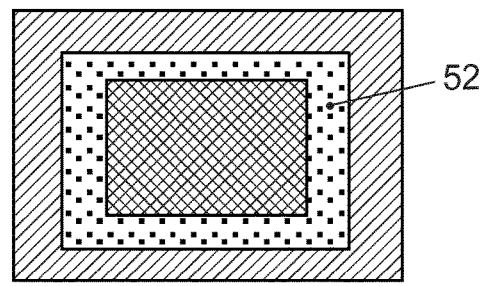

A second layer 52 that likewise has a polymer and additional particles of a fluoropolymer such as PTFE or PVDF that are distributed in the polymer is applied around the encircling edge area of the silicone adhesive layer 51 (FIG. 4C). The polymer can be the same silicone adhesive material as the one for the first layer 51. By the same token, the same particles as those employed in conjunction with FIGS. 2 and 3 can be used as the PTFE or PVDF particles. Optionally, the second layer 52 can also be applied over the first layer 51 with a slight overlap.

Figure 4D:
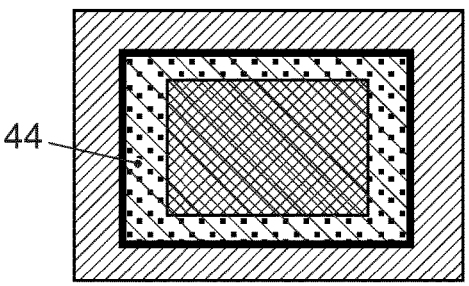

Subsequently, the magnet 44 (here shown in transparent form) is placed onto the adhesive surface made up of the layers 51 and 52, a process in which spacers (e.g. a frame of the appropriate thickness) can be used in order to ensure a uniform and prescribed thickness of the adhesive layer (FIG. 4D). The edges of the magnet 44 preferably run flush with the outer edge of the layer 52. The curing of the silicone adhesive preferably takes place under exposure to heat. This yields a sturdy adhesive bond between the magnet 44 and the silicone adhesive.

Figure 4E:
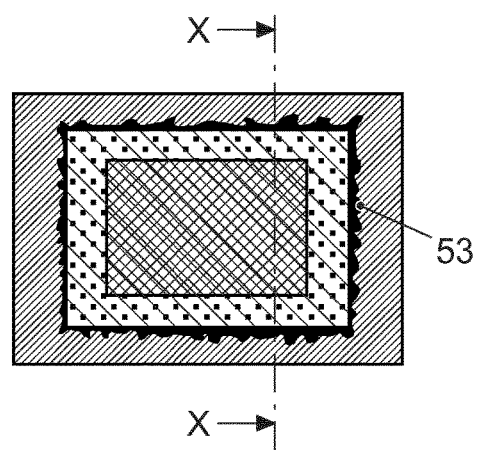
Figure 4F:
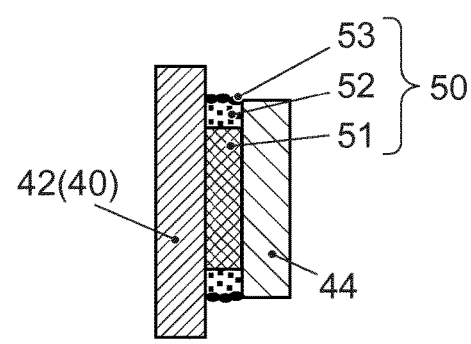
FIG. 4F is a view along section X-X of FIG. 4E.

Subsequently, a third layer 53 is applied onto the outer edge area of the second layer 52 (FIG. 4E). The third layer 53 can fundamentally consist of the same constituents as the third layer 33 of the potting compounds according to FIGS. 2 and 3. Here, too, the third layer 53 is preferably sprayed on as an aerosol and subsequently dried. The configuration of the layer structure 50 for gluing the magnets shown in a sectional view along section X-X of FIG. 4E is depicted in FIG. 4F.

In all of the embodiments according to FIGS. 2 to 4, the outer layer 33 or 53 yields an oleophobic and, at the same time, hydrophobic barrier layer for oil as well as for water. Evidence of oleophobicity is the reduced absorption of oil by the coated materials in comparison to coatings without the outer layer 33 or 53. For example, this can be measured on the basis of the change in the Shore hardness or by ascertaining the volume change due to swelling. In addition, the outer layer 33 or 53 acts as a dielectric barrier layer. Moreover, the layer structures 30 or 50 stand out for their high mechanical strength.

LIST OF REFERENCE NUMERALS 10 electric machine/electric motor
20 stator
22 stator core (core stack)
24 groove
26 winding
28 winding overhang
29 connector ring
30 layer structure/potting compound
31 first layer/polymer layer
32 second layer/polymer-fluoropolymer particle layer
33 outer layer/fluorocarbon layer
34 polymer
35 polymer
36 fluoropolymer particle
37 fluorotenside
40 rotor
42 rotor core (core stack)
44 magnet
46 hub
50 layer structure/adhesive structure
51 first layer
52 second layer
53 outer layer

The invention claimed is:

1. A polymer-based layer structure with an oleophobic-hydrophobic surface configured to coat, seal and/or join technical components or parts thereof, said polymer-based layer structure comprising:
a first layer comprising a first polymer,
a second layer adjoining the first layer, said second layer comprising a second polymer having distributed therein particles comprising a fluoropolymer, and
an outer layer adjoining the second layer, said outer layer comprising a fluorocarbon compound having at least one functional group, and particles distributed in the fluorocarbon, said particles comprising a fluoropolymer, wherein the fluorocarbon compound is a fluorotenside selected from the group consisting of:
partially fluorinated or perfluorinated phosphoric acid esters comprising monoesters, diesters and triesters of phosphoric acid, diphosphoric acid ester and triphosphoric acid ester;
partially fluorinated or perfluorinated phosphonic acid esters, comprising monoesters and diesters of phosphonic acid, diphosphonic acid ester and triphosphonic acid ester;
partially fluorinated or perfluorinated sulfonic acids;
partially fluorinated or perfluorinated sulfuric acid esters;
partially fluorinated or perfluorinated carboxylic acids;
oligomers or telomers thereof;
salts thereof; and
mixtures thereof.

2. The layer structure according to claim 1, wherein the first polymer is selected from the group consisting of: a thermoplastic, an elastomer, a thermoplastic elastomer and a thermosetting plastic.

3. The layer structure according to claim 1, wherein the first polymer is a silicone.

4. The layer structure according to claim 1, wherein the fluorocarbon compound of the outer layer is a fluoroalkyl siloxane.

5. The layer structure according to claim 4, wherein the fluoroalkyl siloxane comprises a tridecafluorooctyl triethoxy siloxane.

6. The layer structure according to claim 1, wherein the at least one functional group is a polar and/or ionic group.

7. The layer structure according to claim 1, wherein the fluorotenside is a partially fluorinated $C_2$-$C_{40}$ phosphoric acid alkyl ester, or a salt thereof.

8. The layer structure according claim 1, wherein the outer layer contains a wetting agent.

9. The layer structure according claim 8 wherein the wetting agent is an acrylate.

10. The layer structure according to claim 1, wherein the fluoropolymer of the particles of the second layer and/or of the outer layer, independently of each other, is a partially fluorinated or perfluorinated hydrocarbon polymer selected from the group consisting of: a polytetrafluoroethylene (PTFE), a polyvinylidene fluoride (PVDF) and mixtures thereof.

11. The layer structure according to one of claim 1, wherein the polymer of the first layer and/or of the second layer comprises a silicone rubber.

12. The layer structure according to claim 11, wherein the silicone rubber is selected from the group consisting of: a methyl polysiloxane rubber (MQ), a vinyl-methyl polysiloxane rubber (VMQ), a phenyl-vinyl-methyl polysiloxane rubber (PVMQ), and mixtures thereof.

13. The layer structure according to one of claim 1, wherein the polymer of the first layer and/or of the second layer is a silicone adhesive.

14. The layer structure according to claim 13, wherein the silicone adhesive is an addition cross-linked silicone resin.

15. The layer structure according to claim 1, wherein the first layer comprises a filler.

16. The layer structure according to claim 1, wherein the fluorotenside is an ionic fluorotenside.

17. An electric machine comprising;
a stator; and
a rotor;
wherein the stator and/or the rotor comprises one or more winding and/or permanent magnets, and
wherein the electric machine further comprises an oleophobic-hydrophobic layer structure according to claim 1 arranged in an area of the winding and/or in an area of a connector ring and/or as an adhesive structure for the permanent magnets.

18. The electric machine according to claim 17, wherein the oleophobic-hydrophobic layer structure is an adhesive structure for the permanent magnets.

19. The layer structure according to claim 15, wherein the filler comprises particles, beads or hollow beads made of quartz, glass, aluminum oxide, boron nitrite, graphite or metal.

* * * * *